US007025081B2

(12) United States Patent
Colangelo et al.

(10) Patent No.: US 7,025,081 B2
(45) Date of Patent: Apr. 11, 2006

(54) DISPENSING APPARATUS FOR VISCOUS LIQUIDS

(75) Inventors: Paul K. Colangelo, Lawrenceville, GA (US); Peter J. Petrecca, Dunwoody, GA (US); Alan Ramspeck, Cumming, GA (US); Michael Walker, Atlanta, GA (US)

(73) Assignee: Nordson Corporation, Westlake, OH (US)

( * ) Notice: Subject to any disclaimer, the term of this patent is extended or adjusted under 35 U.S.C. 154(b) by 153 days.

(21) Appl. No.: 10/288,172

(22) Filed: Nov. 5, 2002

(65) Prior Publication Data

US 2004/0011817 A1 Jan. 22, 2004

Related U.S. Application Data

(62) Division of application No. 09/578,366, filed on May 25, 2000, now Pat. No. 6,499,629.

(60) Provisional application No. 60/136,461, filed on May 28, 1999.

(51) Int. Cl.
*F16K 53/00* (2006.01)
*B62D 5/62* (2006.01)

(52) U.S. Cl. ...................... 137/341; 137/338; 137/828; 222/146.5

(58) Field of Classification Search ............ 222/146.5; 137/338, 341, 828
See application file for complete search history.

(56) References Cited

U.S. PATENT DOCUMENTS

| | | | | |
|---|---|---|---|---|
| 2,025,509 A | | 12/1935 | Hieber | 219/27 |
| 3,818,930 A | * | 6/1974 | Crum et al. | 137/341 |
| 4,334,637 A | | 6/1982 | Baker et al. | 222/146 |
| 4,711,379 A | | 12/1987 | Price | 222/146.5 |
| 4,726,822 A | | 2/1988 | Cates et al. | 55/267 |
| 4,752,670 A | * | 6/1988 | Traub et al. | 219/238 |
| 5,336,320 A | | 8/1994 | Hogan et al. | 118/300 |
| 5,375,738 A | * | 12/1994 | Walsh et al. | 222/1 |
| 5,407,101 A | * | 4/1995 | Hubbard | 222/146.5 |
| 5,706,982 A | * | 1/1998 | Siddiqui et al. | 222/146.5 |
| 5,837,975 A | | 11/1998 | Dillard et al. | 219/456 |
| 5,913,455 A | | 6/1999 | La et al. | 222/146.5 |
| 5,934,520 A | | 8/1999 | Byerly et al. | 222/504 |
| 6,056,155 A | | 5/2000 | Byerly et al. | 222/1 |
| 6,175,101 B1 | | 1/2001 | Miller et al. | 222/146.5 |

FOREIGN PATENT DOCUMENTS

| | | |
|---|---|---|
| DE | 3214726 A1 | 10/1983 |
| EP | 0855228 A2 | 7/1998 |
| WO | 98/10251 | 3/1998 |

* cited by examiner

*Primary Examiner*—A. Michael Chambers
(74) *Attorney, Agent, or Firm*—Wood, Herron & Evans, L.L.P.

(57) ABSTRACT

Apparatus for dispensing viscous liquid, such as hot melt adhesive, includes a manifold, a dispensing module, a heater thermally coupled to the manifold, and thermally insulating cover structure secured around both the module and the manifold. Air gaps are formed between the cover structure and the heated components inside to further reduce heat transfer. The cover structure may also include heat dissipating fins. A supply connector associated with the manifold includes an interior flow passage, an exterior annular recess and at least one port communicating therebetween. A valve includes a valve seat having an orifice and a sealing surface located around the orifice. The valve further includes a valve stem movable between open and closed positions and having a recess in one end and a sealing edge located around the recess. A valve module includes an integrated heating element for providing localized heat to the adhesive immediately prior to dispensing.

9 Claims, 6 Drawing Sheets

DISPENSING APPARATUS FOR VISCOUS LIQUIDS

This application is a divisional of application Ser. No. 09/578,366, filed May 25, 2000 now U.S. Pat. No. 6,499,629 which is based on and claims the priority of Provisional Application Serial No. 60/136,461, filed May 28, 1999. The disclosures of these applications are hereby fully incorporated by reference herein.

FIELD OF THE INVENTION

The present invention generally relates to liquid dispensing technology and, more specifically, to adhesive dispensers using heated or unheated manifolds and valve modules to selectively dispense liquid adhesive.

BACKGROUND OF THE INVENTION

Existing hot melt adhesive dispensers operate at relatively high temperatures, such as above about 250° F. Present dispenser configurations have high temperature surfaces exposed to personnel. Considerable measures are taken to guard or insulate the dispensing equipment from nearby personnel. However, this also reduces the ease with which the equipment may be serviced by such personnel.

Many hot melt dispensers include a heated manifold for supplying hot liquid adhesive to one or more valve modules. Very often, these manifolds are heated by cartridge heaters or other heating elements contained within the manifold. The manifold may therefore contain high tolerance bores for receiving the heaters. Air gaps can exist between the heaters and the manifold resulting in localized hot spots or overheating. Over time, these hot spots will cause heater failure. In some cases, it may also be difficult to obtain highly uniform heating of a manifold through the use of internal heaters. For example, small manifolds or irregularly-shaped manifolds may not easily permit the use of cartridge heaters or cast-in-place heaters.

Present methods of supplying liquid hot melt adhesive can also result in adhesive stagnation and air pocketing. This contributes to char formation and related overheating problems which then adversely affect dispenser performance. Also, the typical circular cross sectional flow area of liquid supply passages is an inefficient heat transfer configuration. Many manifolds are also constructed of cast metal thus leading to lower strength threads and difficulty in accommodating a liquid filter.

Another problem arising when dispensing viscous liquids, such as hot melt or room temperature adhesive, relates to the formation of tailing, stringing or drooling of adhesive upon liquid cut-off. The inertial effects of fluid flow may prolong adhesive cut-off, therefore resulting in these undesirable effects. In a traditional valve arrangement, liquid adhesive flows parallel to a valve stem into the valve seat area. When the end of the valve stem is lifted from the seat, the flow path is relatively straight. As the valve stem approaches the seat, the liquid inertia combines with the decreasing flow area between the valve stem and the seat edge thereby resulting in increased liquid flow velocities. These increased velocities can lead to stringing, tailing or drooling of adhesive after cut-off. When dispensing hot melt adhesives, the same cut-off problems can arise if the adhesive is not maintained at the proper set point temperature in the nozzle.

It would therefore be desirable to provide dispensing apparatus for dispensing liquid hot melt or room temperature adhesive and overcoming problems in the art such as those mentioned above.

SUMMARY OF INVENTION

In one general aspect, the invention provides apparatus for dispensing liquid hot melt adhesive, including a manifold, a dispensing module connected with the manifold, a heater thermally coupled with the manifold and a thermally insulating cover structure surrounding the module and the manifold for preventing exposure of personnel to the hot manifold and module surfaces. The cover structure is preferably formed of a plastic material having a low thermal conductivity and preferably includes a plurality of outwardly projecting fins for further dissipating heat. Ideally, the outer edges of the fins are maintained at a temperature below a burn threshold temperature. Also in accordance with the invention, air spaces or gaps are formed between the cover structure and the module and between the cover structure and the manifold for decreasing heat transfer to the cover structure.

According to another feature of the invention, a thin film heater is bonded directly to the manifold. The thin film heater supplies heat directly through outer surfaces of the manifold. In this way, the manifold may be small and/or irregularly-shaped and still be heated in a uniform and efficient manner. Power consumption is also reduced, especially when combined with the thermally insulating cover structure. Preferably, the heater incorporates a sensor for temperature control purposes and may also incorporate a thermal fuse or thermostat for protection against overheating.

In one alternative, a manifold assembly comprises a manifold body including an inlet bore having an interior wall and a liquid supply passage communicating with the inlet bore. A heater is thermally coupled with the manifold body. A supply connector extends within the inlet bore and is configured therewith to provide better heat transfer and manufacturing advantages, such as thread elimination and alternative connection orientations. The supply connector includes an interior flow passage, an exterior annular recess disposed adjacent the interior wall of the inlet bore, and at least one port communicating between the interior flow passage and the exterior annular recess. The annular recess communicates with the liquid supply passage of the manifold. The inlet bore preferably extends completely through the manifold and is preferably a smooth bore. A pair of seals extend around the connector each respectively engaging the interior wall on opposite sides of the liquid supply passage. In one alternative, the connector further comprises a filter retained in the interior flow passage for filtering the liquid hot melt adhesive flowing into the exterior annular recess.

In another aspect of the invention, a valve is provided for dispensing viscous liquids, such as hot melt adhesives or room temperature adhesives. The valve includes a valve seat having an orifice and a sealing surface located around the orifice. A valve stem is movable between open and closed positions with respect to the valve seat and includes one end with a recess and a sealing edge located around the recess. The sealing edge is engaged with the sealing surface of the valve seat in the closed position and is spaced from the sealing surface in the open position. The recess is designed to provide a more tortuous flow path for the liquid to reduce the localized liquid flow velocities and thereby reduce undesirable cut-off effects, such as stringing, tailing or drooling of adhesive.

Another feature of the invention relates to a unique, temperature controlled valve module. More specifically, the valve module dispenses heated liquids at a predetermined set point temperature, such as in the case of the application temperature of a hot melt adhesive. The valve module includes a module body having a liquid cavity communicating with a dispensing orifice, a valve seat disposed generally between the liquid cavity and the dispensing orifice and a valve stem mounted for movement within the cavity between engaged and disengaged positions relative to the valve seat for selectively dispensing liquid from the dispensing orifice. In accordance with this aspect of the invention, a heating element is thermally coupled with the module body and a temperature sensor is also thermally coupled with the module body for detecting the temperature of the liquid. This coupling may be a direct incorporation within the module body or, for example, may be separate pieces in thermal contact. Advantageously, this configuration more accurately controls the liquid temperature at the desired set point temperature within the dispensing orifice or nozzle. This results in better cut-off and less stringing of viscous liquids, such as hot melt adhesive.

These and other advantages, objects and features of the invention will become more readily apparent to those of ordinary skill in the art upon review of the following detailed description of the preferred embodiment taken in conjunction with the accompanying drawings.

DETAILED DESCRIPTION OF DRAWINGS

DETAILED DESCRIPTION OF PREFERRED EMBODIMENTS

Figure 1:
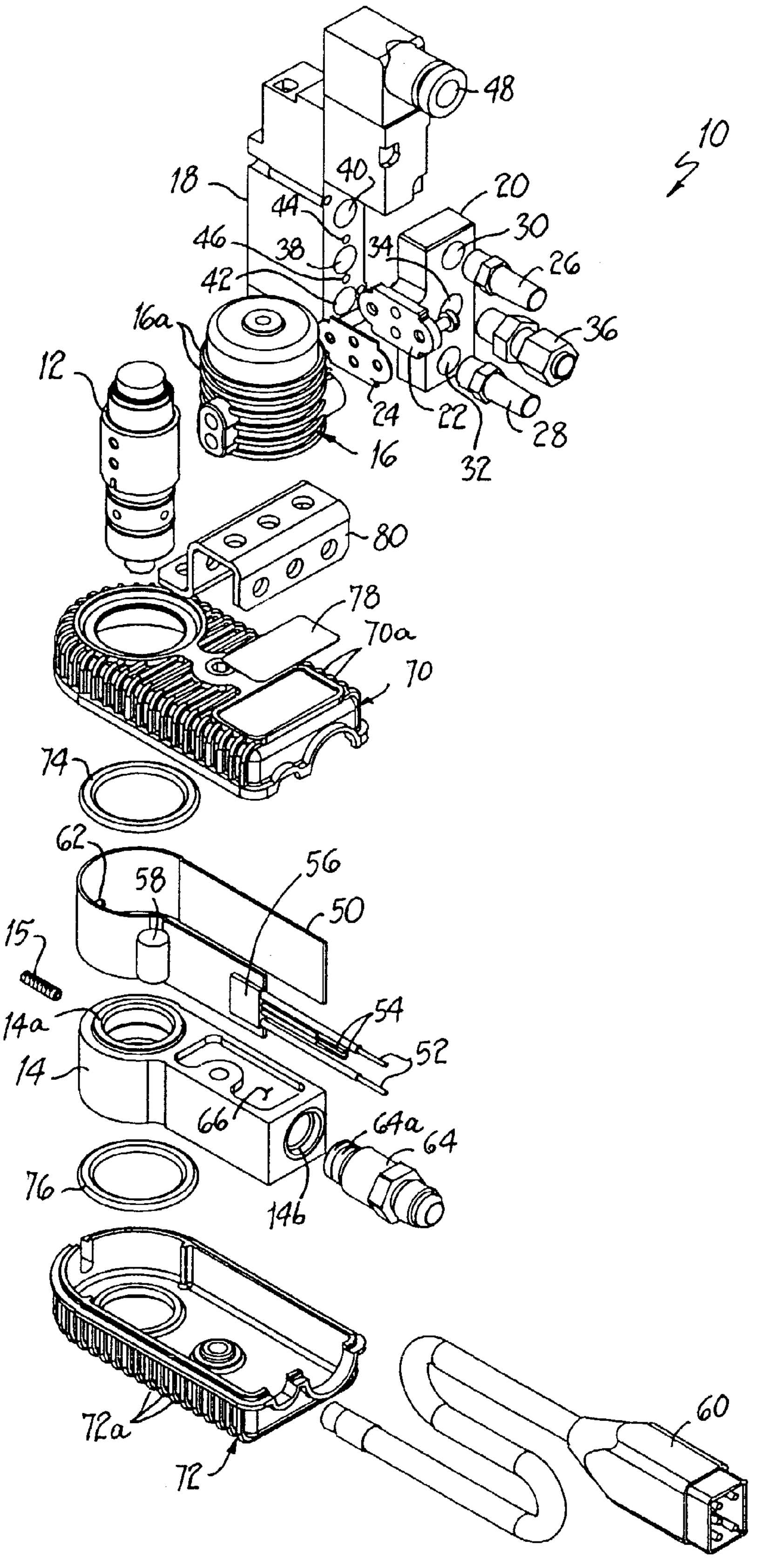
FIG. 1 is an exploded perspective view of a hot melt adhesive dispensing apparatus constructed in accordance with a preferred embodiment of the invention.
Figure 2:
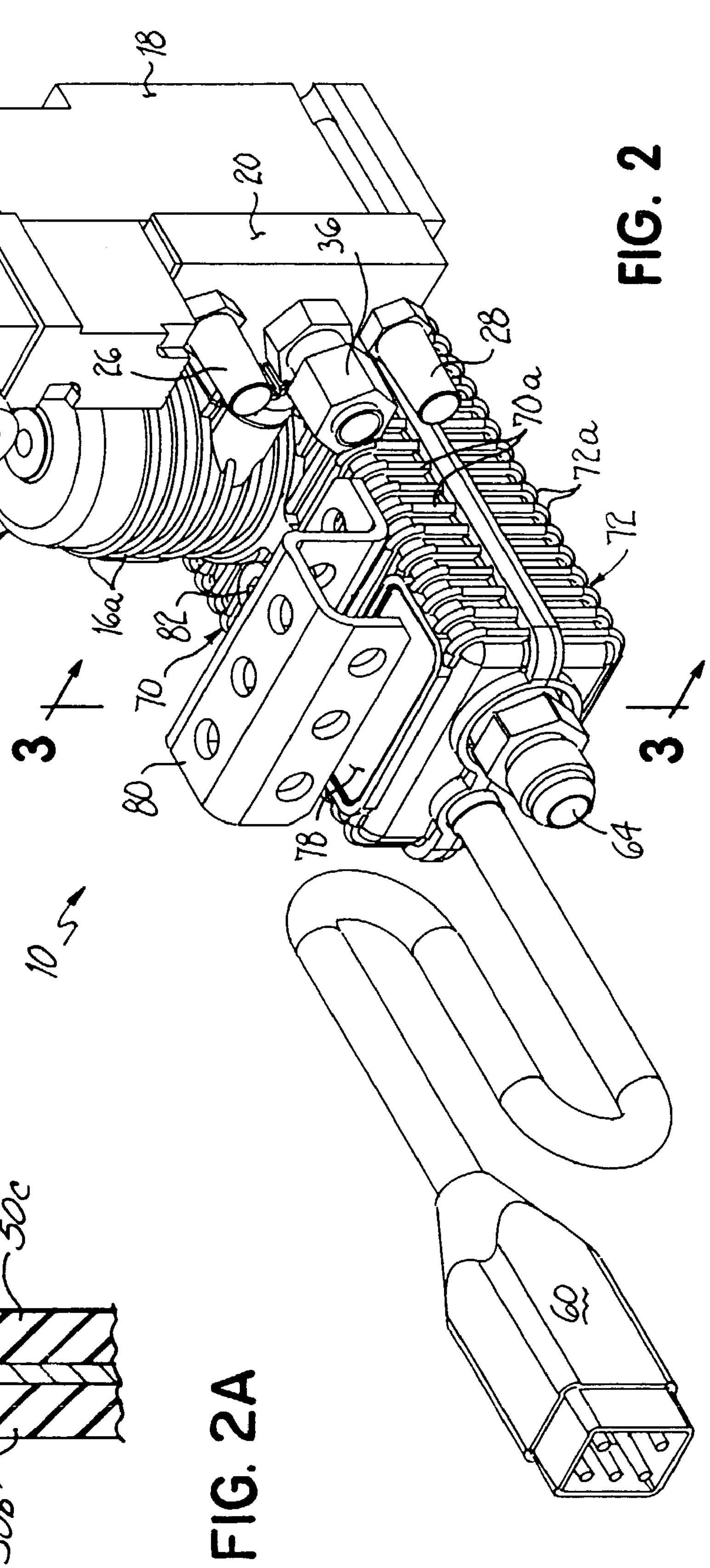
FIG. 2 is an assembled perspective view of the hot melt dispensing apparatus shown in FIG. 1.

Referring to FIGS. 1 and 2, a hot melt adhesive dispensing apparatus 10 of the invention includes a dispensing module 12 and a liquid supply manifold 14. Dispensing module 12 is positioned within a mounting bore 14*a* of manifold 14 by a set screw 15. An air actuation cap 16 covers the upper end of dispensing module 12 and includes heat dissipating fins 16*a*. A solenoid valve 18 is connected to air actuation cap 16 by an adapter 20 having a flange 22. A seal 24 is disposed between air actuation cap 16 and adapter flange 22. As will be described in greater detail below, adapter 20 directs pressurized air into module 12 through air actuation cap 16 to actuate a valve within module 12 between open and closed positions.

Respective mufflers 26, 28 are connected within threaded exhaust ports 30, 32 of adapter 20. A central supply port 34 receives an air supply connector 36. Port 34 connects with supply port 38 of solenoid valve 18. Respective exhaust ports 30, 32 of adapter 20 connect with exhaust ports 40, 42 of solenoid valve 18. A suitable seal (not shown) is disposed between solenoid valve 18 and adapter 20. Solenoid valve 18 further includes air outlets 44, 46 for actuation purposes. An electrical connector 48 is provided for connecting solenoid valve 18 to suitable electrical control devices for actuation control purposes.

Figure 2A:
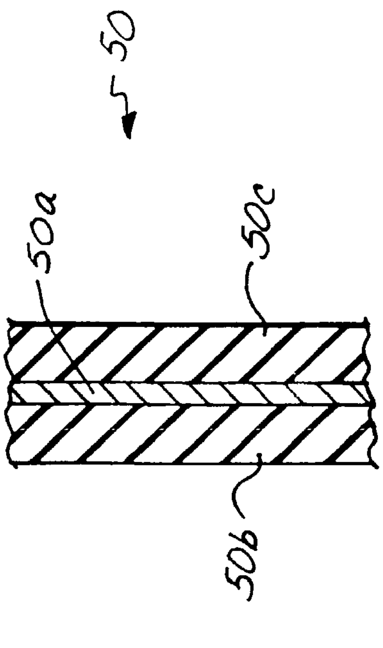
FIG. 2A is an enlarged cross sectional view of a thin film heater of the invention.

A thin film heater 50 is preferably adhered to the outer surface of manifold 14. For example, an inner silicone layer of thin film heater 50 may be vulcanized to the outer surface of manifold 14. Heater 50 may be formed in various manners, such as by sandwiching an etched foil electrical trace between suitable thin material layers, such as silicone, Kapton® or PTFE. Alternatively, a wire element may be used as the electrical trace between such thin film materials. The preferred thin film heater 50, as shown in the enlarged cross sectional view of FIG. 2A, is comprised of a thin etched-foil heating element 50*a* sandwiched between two layers 50*b*, 50*c* of high temperature silicone rubber. The etched-foil heating element or trace 50*a* may be formed to generate heat uniformly or non-uniformly. In the latter regard, more heat may be generated in areas of the manifold 14 that require such additional heat, for example, to provide a more uniform temperature profile throughout the manifold 14. Heater 50 may optionally be bonded to the outside surface of the manifold 14 with a high temperature adhesive. Heater 50 is maintained in intimate contact with the manifold, which is an advantage over commonly used insert-style cartridge heaters. Additionally, the area through which heat is transferred is greater than that of a cartridge heater. This lowers the watt density requirements of the heater, i.e., it lowers the required watts per unit of heat transfer area.

Heater 50 includes wire leads 52 connected with a suitable power source for supplying electrical current to the resistive electrical trace and wire leads 54 for connecting a temperature sensor 56 with a conventional temperature control. Sensor 56 may be used in a conventional feedback control system for controlling the amount of heat delivered to manifold 14 through heater 50. A fuse or thermostat 58 may be connected in series with the power leads 52 of heater 50 for electrically disconnecting heater 50 in the event of an excessive temperature condition. A cord set 60 connects with leads 52, 54, and an electrical grounding lead (not shown). Heater 50 further includes a hole 62 for receiving fastener 15 during assembly against manifold 14. An inlet connector 64 is affixed to manifold 14 by engaging threaded portions 14*b*, 64*a*. A recessed area 66 is formed in manifold 14 for heat transfer reduction, as will be discussed below.

In addition to air actuation cap 16, additional covering structure is provided in the form of cover halves 70, 72 which house manifold 14. Cover halves 70, 72 likewise include heat dissipating fins 70*a*, 72*a*. Cap 16 and cover halves 70, 72 are preferably formed from a high temperature plastic such as polyphenylene sulfide (PPS). Preferably, the material has a low thermal conductivity. Fins 16*a*, 70*a* and 72*a* further act to dissipate heat and reduce the temperature of the outer touchable surfaces. Preferably, the outer touchable surfaces are reduced to a temperature at or below 167° F. (75° C.), although the internal components may be at application temperatures of 250° F. or higher. Respective seals 74, 76 are disposed between cover halves 70, 72 and manifold 14. An identification plate 78 may be affixed to cover half 70.

Figure 3:
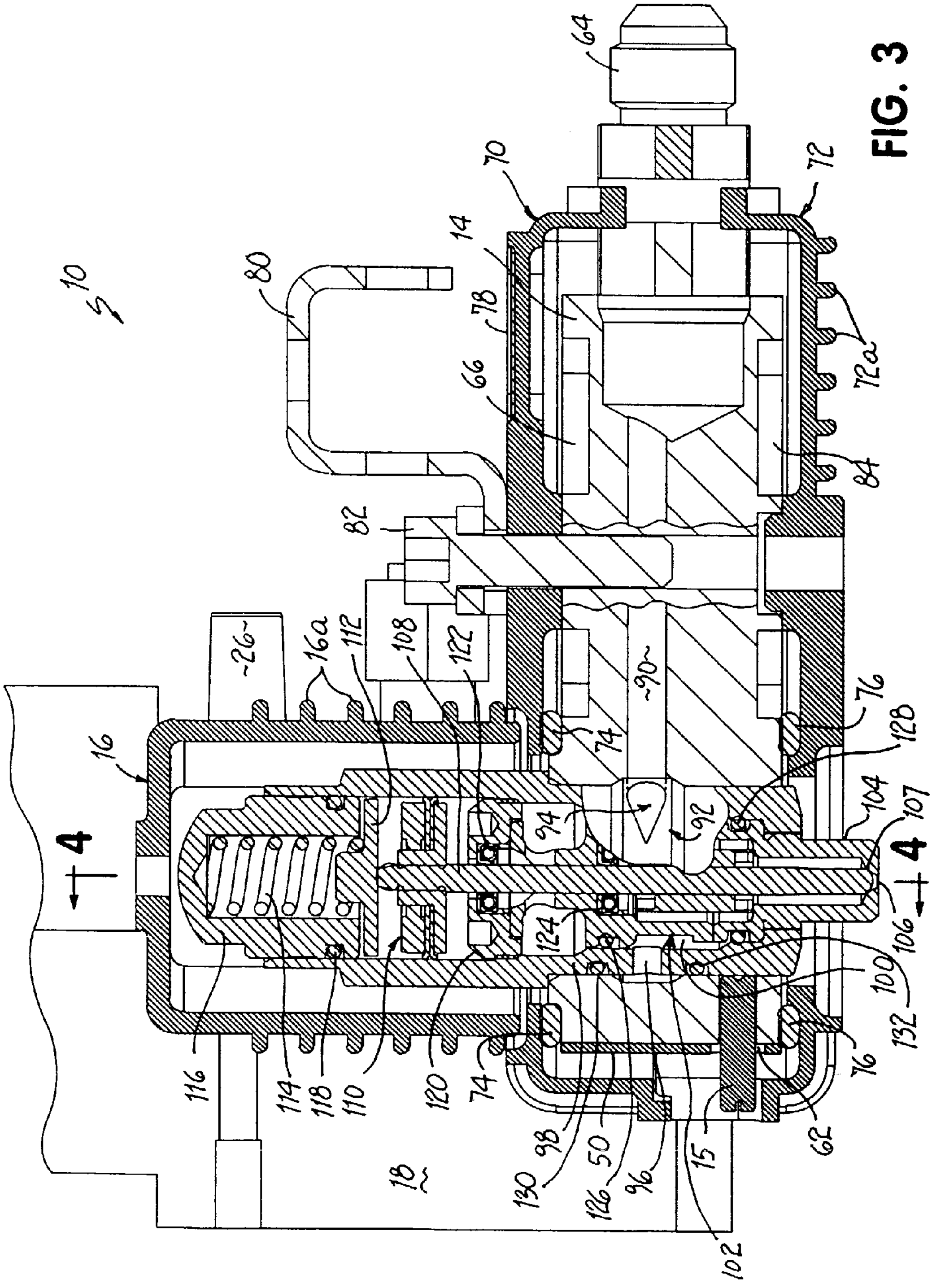
FIG. 3 is a cross sectional view of the apparatus taken along line 3—3 of FIG. 2.
Figure 4:
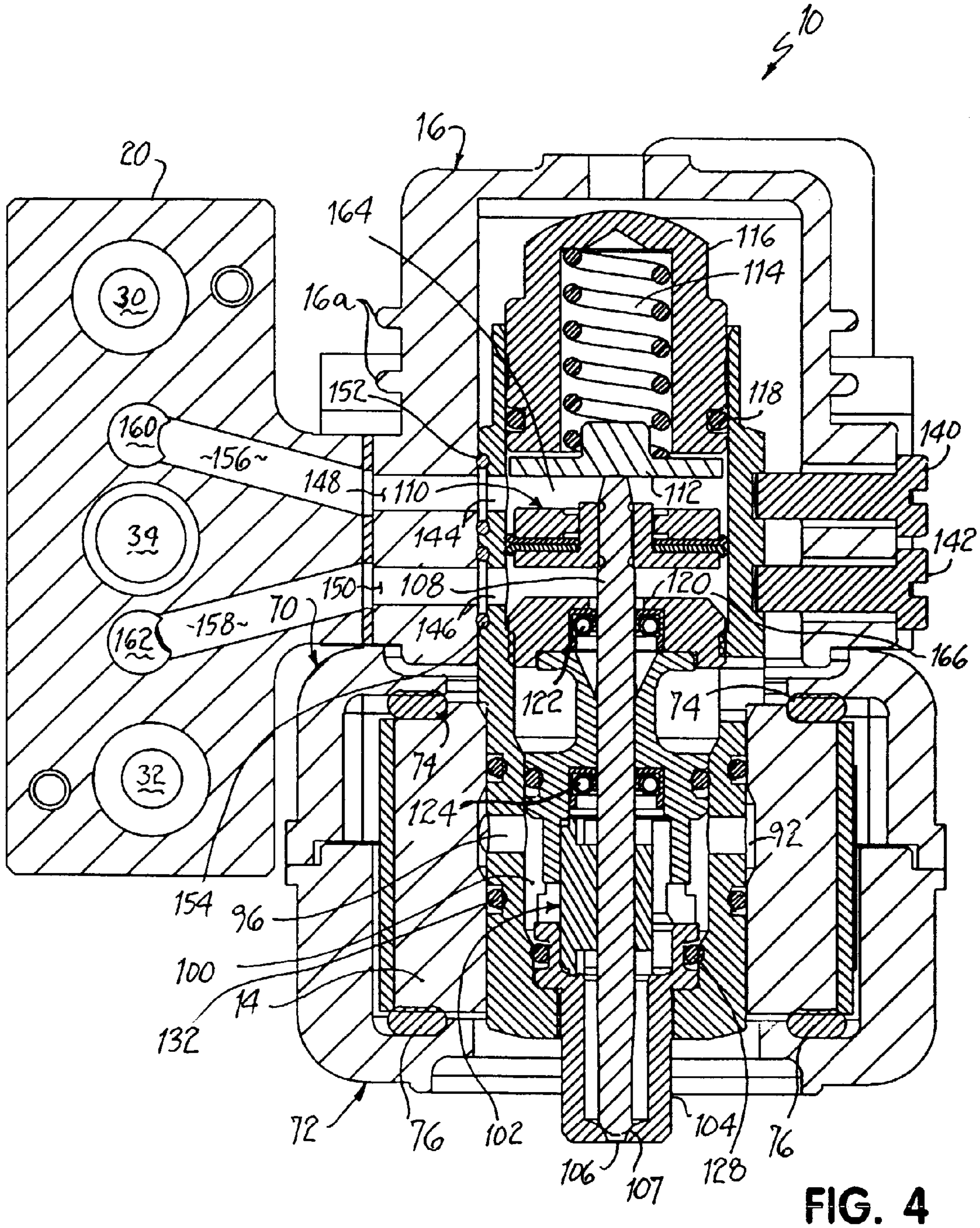
FIG. 4 is a cross sectional view taken along line 4—4 of FIG. 3.

Turning now to FIGS. 3 and 4, a fastener 82 connects mounting plate 80 through cover half 70 to manifold 14. An additional recessed area 84, like recessed area 66, is formed in manifold 14 for reducing heat transfer to cover half 72. Areas 66 and 84 form thermally insulating gaps between cover halves 70, 72 and manifold 14. A supply passage 90 is formed in manifold 14 and communicates with an annular recess 92 contained within mounting bore 14*a*. Supply passage 90 enters annular recess 92 at a tangential entry point 94 to assist with liquid circulation. At least one supply port, and preferably multiple supply ports 96, are formed in a module body 98. These ports 96 communicate with an interior cavity 100 within module body 98. Cavity 100 contains a cartridge 102 as more fully disclosed and claimed in U.S. patent application Ser. No. 08/963,374, assigned to the assignee of the present application, the disclosure of which is fully incorporated by reference herein. A nozzle mounting portion 104 includes a dispensing orifice 106 which is opened and closed by a valve stem 108. Nozzle mounting portion 104 will typically be externally threaded to carry an internally threaded nozzle (not shown). Valve stem 108 is supported for longitudinal movement with respect to a valve seat 107 by a guide 103 of cartridge 102. Valve stem 108 carries a piston assembly 110 proximate an opposite end. A button 112 bears against this end of valve stem 108 under the bias of a spring 114 contained within a cap 116. Cap 116 is crimped within module body 98 and sealed by an O-ring 118. On an opposite side of piston assembly 110, a retainer 120 is threaded within module body 98 and holds cartridge 102 in place. An air seal 122 engages valve stem 108 and a liquid seal 124 engages valve stem 108. Respective O-rings 126, 128 seal the exterior of cartridge 102 against the interior of cavity 100 and O-rings 130, 132 seal the exterior of module body 98 against mounting bore 14*a* on opposite sides of liquid supply recess 92.

A pair of fasteners 140, 142 affix air actuation cap 16 to module body 98. Specifically, module body 98 is affixed and aligned within air actuation cap 16 such that ports 144, 146 align with ports 148, 150 of cap 16. O-rings 152, 154 seal the respective junctions between ports 144, 148 and ports 146, 150. Outlet passages 156, 158 respectively communicate with ports 148, 150 and receive pressurized air from passages 160 and 162 in adapter 20. Passages 160, 162 respectively receive pressurized air from passages 44 and 46 in solenoid valve 18. When pressurized air is directed through port 144 into an upper piston chamber 164, piston assembly 110 will move downward to move valve stem 108 against seat 107 to the closed position shown in FIGS. 3 and 4.

Conversely, when pressurized air is directed through port 146 into a lower piston chamber 166, piston assembly 110 will be moved upward against the bias of spring 114 thereby moving valve stem 108 to an open position to dispense liquid from dispensing orifice 106. As will be apparent from FIGS. 3 and 4, air gaps are created respectively between air actuation cap 16 and module body 98 and between respective cover halves 70, 72 and heated manifold 14. These air gaps act as thermal insulators to assist in preventing heat transfer from the hot module body 98 and manifold 14 into respective cover structures, i.e., cap 16 and cover halves 70, 72.

Figure 5:
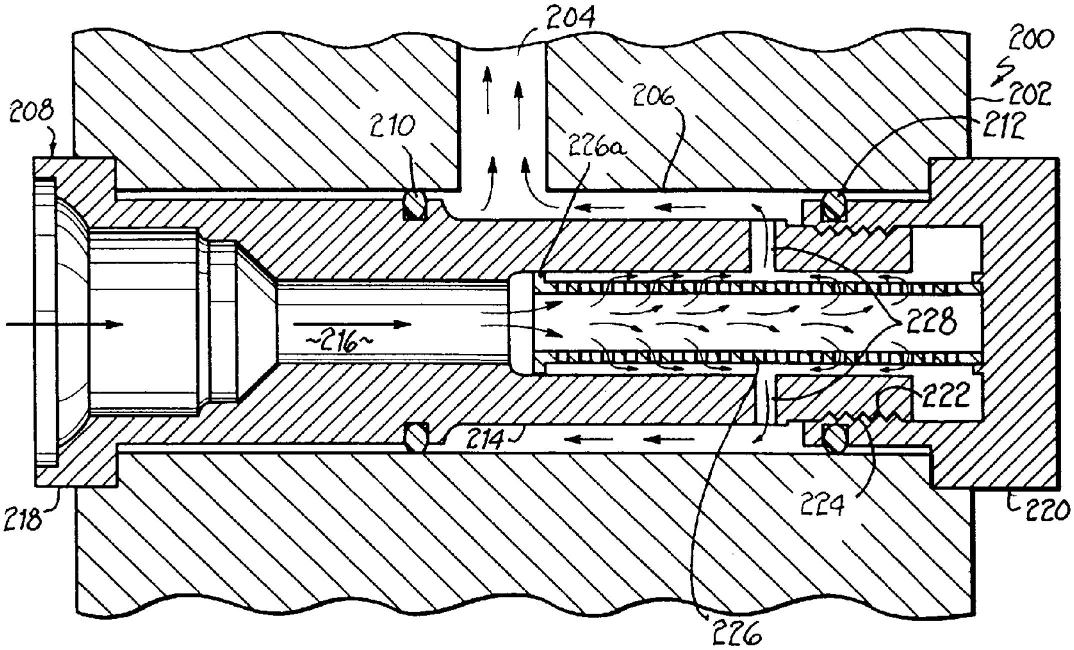
FIG. 5 is a cross sectional view of a manifold assembly, similar to that shown in FIG. 1, but showing an alternative liquid inlet connector.

Referring to FIG. 5, an alternative manifold assembly 200 is shown and, particularly, an alternative supply connection is shown in place of connector 64. Manifold assembly 200 includes a manifold body 202 having a supply passage 204. In all respects except those discussed in connection with FIG. 5, manifold body 202 may take the form of manifold 14. A bore 206 receives a supply connector 208. A pair of O-rings 210, 212 seal smooth bore 206 on opposite sides of supply passage 204. Supply passage 204 leads to a dispensing module, such as module 12 discussed in the first embodiment. An annular recess 214 is formed on the outer surface of connector 208 and communicates with passage 204. Connector 208 further includes an internal bore 216 adapted for connection to a pressurized supply of, for example, liquid hot melt adhesive. Connector 208 is affixed within smooth bore 206 by a flange portion 218 and a nut 220 which is tightened to draw flange portion 218 and nut 220 against manifold body 202 through the interaction of respective internal and external threads 222, 224. Nut 220 may be affixed to or integrally formed with a filter 226 which extends within bore 216. Alternatively, the filter 226 may be eliminated and nut 220 may be modified accordingly into another fastening structure. One end 226*a* of filter 226 sealingly engages bore 216 to ensure that liquid flows into filter 226. Liquid flows through filter 226 and into a plurality of radial ports 228 leading to annular recess 214.

There are various advantages to the configuration shown in FIG. 5. For example, the configuration eliminates the need to form threads in the manifold. A supply hose may be attached to either side of the manifold by inserting connector 208 from an opposite direction. The configuration prevents adhesive stagnation and air accumulation points within the manifold. The configuration is also relatively simple to machine. Finally, the connector and manifold design improves heat transfer by utilizing a thin-walled annular flow space. For example, if the annular space formed by annular recess 214 is compared to a typical cylindrical flow passage of equal flow area and "D" represents the diameter of the typical cylindrical cross section, while "$D_o$" represents the outer diameter of the annular space and "$D_i$" represents the inner diameter of the annular space, then the following equation applies:

$$\frac{\pi D^2}{4} = \frac{(D_o^2 - D_i^2)}{4}$$

or $$D^2 = D_o^2 - D_i^2$$

If we assume D=0.250" (typical) and $D_o$=0.625", then: $D_i$=0.573"and the thickness of the annular space is $$t = \frac{D_o^2 - D_i^2}{2} = \frac{0.625 - 0.573}{2} = 0.026''$$

It follows that the surface per unit flow length available for transfer of heat in each case is:

$$\text{circular cross section} = \pi D = \pi(0.250)$$

$$\text{annular cross section} = \pi D_o + \pi D_i = \pi(0.625) + \pi(0.573)$$

Therefore, the ratio of the annular cross section to the $$\text{circular cross section} = \frac{\pi(.625 + .573)}{\pi(.250)} = 4.8$$

That is, the annular configuration produces approximately four to five times more surface area for heat transfer.

Figure 6A:
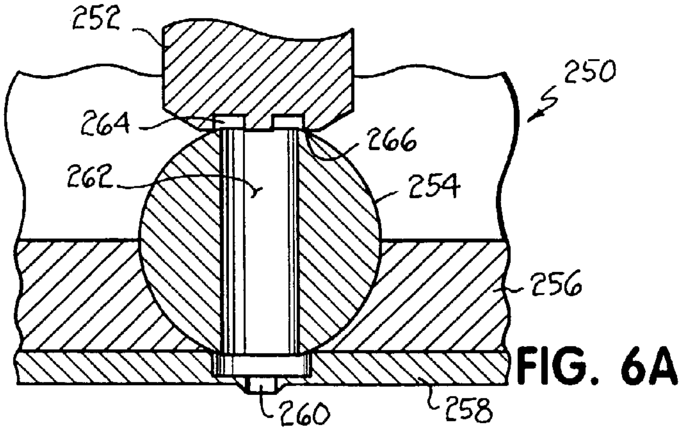
FIG. 6A is a fragmented, partial cross sectional view of an alternative valve assembly shown in a closed position.
Figure 6B:
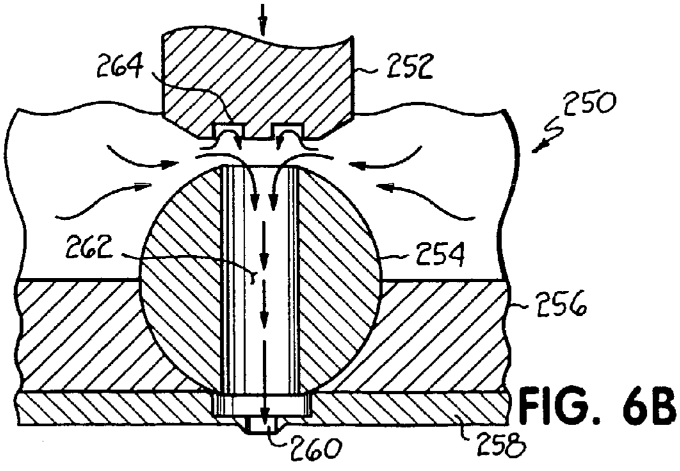
FIG. 6B is a fragmented, partial cross sectional view similar to FIG. 6A, but showing the valve assembly in an open position.

FIGS. 6A and 6B illustrate an alternative valve 250. This valve 250, for example, may be used in place of valve seat 107 and valve stem 108 as illustrated in the first embodiment. Valve 250 comprises a valve stem 252 and a ball 254 utilized as a valve seat. Ball 254 is rigidly affixed, as with a suitable adhesive, within mounting structure 256 which may be part of a nozzle or valve body. A typical nozzle member 258 may be used and includes a dispensing orifice 260. Ball 254 includes a discharge passage 262 aligned with valve stem 252 and dispensing orifice 260. The end of valve stem 252 includes a recess 264, which may be an annular recess as shown or another recess preferably of irregular shape for forcing changes in flow direction. When valve stem 252 is in the closed position shown in FIG. 6A, a sealing line of contact 266 is made between the outer edge of recess 264 and the outer surface of ball 254 immediately outside of discharge passage 262. When valve stem 252 is lifted from ball 254, but moving toward ball 254 (FIG. 6B), liquid will flow into annular recess 264 and create turbulence before exiting through discharge passage 262 and dispensing orifice 260. This turbulence, coupled with the tortuous flow path and localized high pressure zone, will reduce the discharge flow velocity upon valve closure. Reduced liquid discharge velocities will likewise reduce stringing, tailing or drooling of viscous liquids, such as room temperature or hot melt adhesive, upon cut-off. In the full open position, moderate fluid path directional changes and little turbulence will exist to ensure full flow at dispensing orifice 260. Another advantage to valve 250 is that sealing line 266 is much larger in diameter than dispensing orifice 260. With such a relationship, the amount of stem lift required to reach a full flow condition is less than a traditional ball and seat valve.

Figure 7:
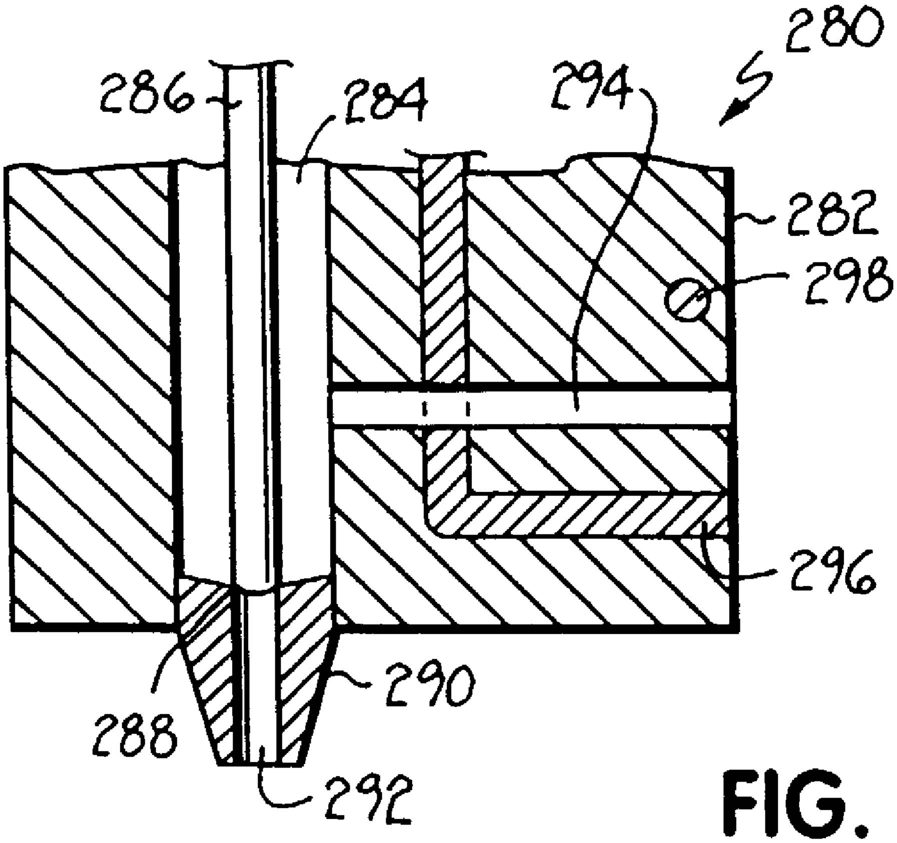
FIG. 7 is a fragmented cross sectional view which schematically illustrates a valve module constructed in accordance with another alternative of the invention.

FIG. 7 illustrates an alternative, temperature controlled valve module 280. Valve module 280 includes a module body 282 having a liquid cavity 284. A valve stem 286 is mounted for reciprocating movement within cavity 284 and with respect to a valve seat 288 associated with a nozzle 290. In a typical manner, when valve stem 286 is lifted from valve seat 288, such as in the air-actuated manner discussed above, liquid will travel through cavity 284 and then through a dispensing orifice 292 within nozzle 290. A supply passage 294 supplies liquid, such as hot melt adhesive, to cavity 284. In accordance with the invention, a heater 296, which may be a cast-in-place heating element, is preferably embedded within the mass of module body 282. As one example, module body 282 may be formed of a heat conductive metal such as aluminum. A temperature sensor 298 is also coupled to module body 282, such as by being embedded in body 282. Preferably, sensor 298 is located an equal or approximately equal distance "d1" from the liquid in passage 294 as the distance "d1" between heater element 296 and passage 294 and generally the distance between heater element 296 and the liquid passing into nozzle 290. Distances "d2" are also approximately equal as shown. These spatial relationships help ensure that the temperature sensed by sensor 298 is the same temperature as the temperature of the liquid entering nozzle 290. Heater element 296 is preferably located centrally within the mass of module body 282 to help ensure uniform heating, at least in the vicinity of nozzle 290. Module 280 may be used with or without an insulated dispenser apparatus, such as apparatus 10 described above. Temperature sensor 298 is preferably connected with a conventional temperature control system which regulates heater 296 to maintain a desired set point temperature based on feedback from temperature sensor 298. Valve module 280 maintains the temperature of nozzle 290 at the desired set point temperature and this results in better cut-off or, in other words, less stringing, tailing and drooling of the liquid upon valve closure. Preferably the mass of module body 282 disposed on one side of heating element 296 is at least approximately equal to the mass on the opposite side of heating element 296 to promote uniform heat transfer.

While the present invention has been illustrated by a description of various preferred embodiments and while these embodiments has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known. However, the invention itself should only be defined by the appended claims, wherein we claim:

We claim:

1. A manifold for delivering liquid hot melt adhesive, the manifold comprising:

a manifold body having an outer surface and including an inlet adapted to be connected to a supply of the liquid hot melt adhesive, an outlet and a supply passage communicating between said inlet and said outlet, and a thin film heater secured to said outer surface of said manifold body and operative to transfer heat to the liquid hot melt adhesive in said supply passage.

2. The manifold of claim 1, wherein said thin film heater further comprises at least three layers with two outer layers sandwiching an electrical heating layer therebetween, said electrical heating layer comprising an electrical resistive heating element.

3. The manifold of claim 2, wherein at least one of said outer layers is formed from a polymeric material.

4. The manifold of claim 1 further comprising:

a temperature sensor thermally coupled to said thin film heater for controlling heat supplied to said manifold.

5. The manifold of claim 4 further comprising:

a thermal device thermally coupled to said thin film heater and operative to electrically disconnect said thin film heater during an overheating condition.

6. A manifold assembly for supplying liquid hot melt adhesive, the manifold assembly comprising:

a manifold body including an inlet bore having an interior wall and a liquid supply passage communicating with said inlet bore, a heater thermally coupled with said manifold body, a supply connector extending within the inlet bore of said manifold body and including an interior flow passage, an exterior annular recess disposed adjacent the interior wall of said inlet bore and at least one port communicating between the interior flow passage and the exterior annular recess, said annular recess communicating with the liquid supply passage of said manifold.

7. The manifold assembly of claim 6, wherein the inlet bore extends completely through said manifold and said interior wall of said inlet bore is smooth.

8. The manifold assembly of claim 7 further comprising a pair of seals extending around said connector, each seal respectively engaging the interior wall on opposite sides of said liquid supply passage and said annular recess.

9. The manifold assembly of claim 7, wherein said connector further comprises a filter retained in said interior flow passage for filtering the liquid hot melt adhesive flowing into said exterior annular recess.

* * * * *